Jan. 12, 1932.　　W. K. McMILLAN　　1,840,784
DOUBLE FOUR-WAY VALVE
Filed Sept. 21, 1927　　2 Sheets-Sheet 1
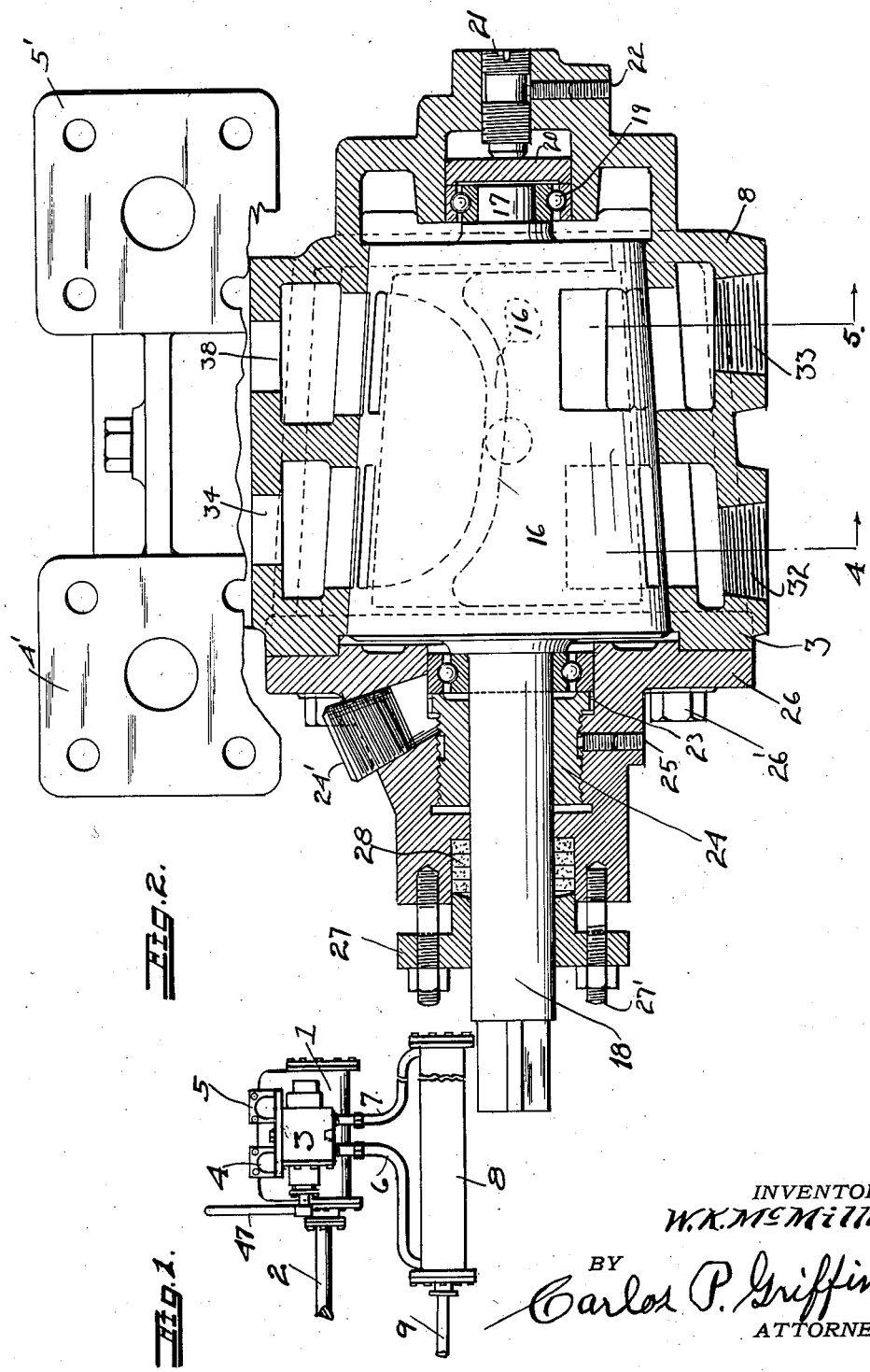
INVENTOR.
W. K. McMillan.
BY
Carlos P. Griffin
ATTORNEY.

Jan. 12, 1932. W. K. McMILLAN 1,840,784
DOUBLE FOUR-WAY VALVE
Filed Sept. 21, 1927 2 Sheets-Sheet 2
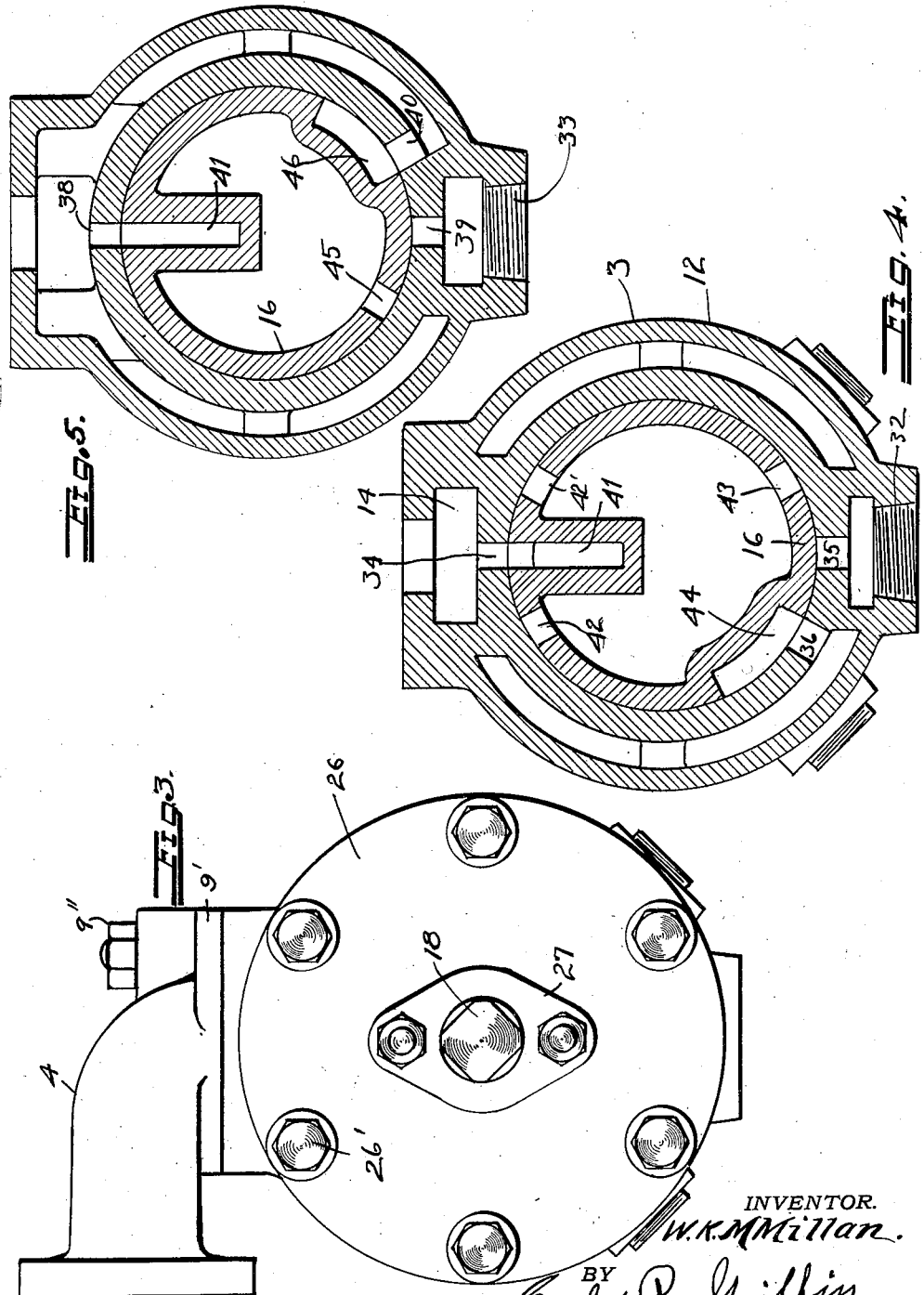
INVENTOR.
W. K. McMillan.
BY Carlos P. Griffin
ATTORNEY.

Patented Jan. 12, 1932

1,840,784

UNITED STATES PATENT OFFICE

WESLEY KENNETH McMILLAN, OF SAN FRANCISCO, CALIFORNIA, ASSIGNOR, BY MESNE ASSIGNMENTS, TO AMERICAN TRACTOR EQUIPMENT CO., A CORPORATION OF NEVADA

DOUBLE FOUR WAY VALVE

Application filed September 21, 1927. Serial No. 220,967.

This invention relates to a double four-way valve intended for the purpose of supplying both ends of a hydraulic cylinder with fluid under pressure and for allowing that fluid to escape therefrom as rapidly as the fluid passing to the other end of the cylinder will permit.

Another object of the invention is to produce a valve which will be easily operated and which will be capable of withstanding rough usage without serious injury.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a diagrammatic side elevation of the valve as it appears attached to a hydraulic cylinder, Figure 2 is a vertical sectional view of the valve cylinder, the attached valve pipes being shown in solid lines above the same, Figure 3 is an end view of the valve looking from the left hand end of Figure 2, Figure 4 is a vertical sectional view of the valve plug and cylinder on the line 4, Figure 2 looking in the direction of the arrow, and Figure 5 is a vertical sectional view of the valve on the line 5, Figure 2 looking in the direction of the arrow.

The numeral 1 indicates an ordinary form of pump cylinder which has the operating piston 2 and on the side of which the valve casing 3 is secured. This valve casing has the inlet 4 and outlet 5 which simply by-passes the fluid back to the pump, the pump itself forming no part of the present invention.

Connected with the casing 3 are two pipes 6 and 7 which lead to opposite ends of the hydraulic cylinder 8, said cylinder having a piston therein to which the piston rod 9 is connected, and which rod may operate any desired piece of apparatus.

In Figure 2 the valve casing is indicated at 3 and 4' and 5' indicate the flanges on the pump cylinder 1 to which this valve is secured, the flange 4' being on the inlet side of the valve and the flange 5' being on the discharge side of the valve. The valve itself is frustoconical, and is indicated at 16, while it has a short stud 17 at one end and an operating shaft 18 at the other end. Ball bearings 19 and 23 serve to hold the valve central in its casing, and to allow it to operate with the minimum of friction.

The ball bearing assembly 19 is adjusted longitudinally by means of a bearing plate 20 and set screw 21 and the latter is held in a given position by means of the set screw 22. At the opposite end the bearing 23 is adjusted in position by means of a bushing 24 which is turned by the application of a screw driver through the hole closed by the plug 24', and this bushing is held in a fixed position by means of the set screw 25.

At the large end of the casing there is a flange 26 which is secured thereto by means of suitable bolts 26'. In order to prevent leakage from the valve the shaft 18 is provided with the packing gland 27 which is held in place by means of the bolts 27', and it has suitable packing plates therein as indicated at 28. The bottom of the casing is provided with two threaded openings 32 and 33 to receive the pipes 6 and 7 respectively. At the top the two inlet elbows are secured to a plate 9', and that plate is held in place on the casing by means of a bolt 9''.

One end of the valve is intended to supply and discharge the fluid used in one end of the hydraulic cylinder, while the other end of the valve is intended to supply and discharge the fluid used in the other end of the hydraulic cylinder, these operations taking place simultaneously and alternately, that is, when one end of the hydraulic cylinder is receiving fluid under pressure, the other is discharging it back to the pump and in the same way when the opposite end of the hydraulic cylinder is receiving fluid under pressure the valve receives the discharge from the other end of the cylinder, and then it passes back into the pump. The large end of the valve casing has the receiving port 34, the outlet and inlet port 35 and the discharge port 36. The small end of the valve casing has the exhaust port 38, the inlet and outlet port 39 and the outlet port 40. The valve itself has the by-pass channel 41, two inlet ports 42, 42′, the outlet port 43 and a longer discharge port 44 at its large end.

At the small end the valve has an outlet port 45 and a discharge port 46 substantially the same as the discharge port 44, but oppositely positioned with respect thereto.

The valve is turned by means of a handle 47 which is secured on the squared end of the shaft 18.

The operation of the valve is as follows: Assuming the pump 1, whether of the character indicated in the drawing or of some other character, such as a gear pump, to be running at all times, the fluid used in the hydraulic cylinder is pumped through the elbow 4 at all times. If the hydraulic cylinder is not to be used the valve 16 is placed in the position shown in Figures 4 and 5, and in Figure 1 so that all of the fluid forced through the valves of the pump will be by-passed back to the same through the channel 41 without in any way effecting the hydraulic cylinder. If the cylinder is to be operated the valve 16 will be turned so that the port 42 registers with the port 34. This will permit the fluid used by the pump to pass through the ports 34, 42, 43 and 35 to enable the left hand end of the cylinder 8, to receive fluid. At the same time the port 46 will cover the two ports 39 and 40 and whatever fluid is in the right hand end of the cylinder 8 will be ejected therefrom, pass through the ports 39, 46 and 40 to the outside of the inner walls of the casing 3 and then pass through the port 38 back to the pump.

If the position of the valve 16 is shifted so that the port 42′ registers with the port 34, the port 44 will cover the two ports 35 and 36 and any fluid that is in the left hand end of the cylinder 8 will be delivered to the outside chamber of the valve by the two walls of the casing 3, and as this chamber connects with the discharge pipe 5, whatever fluid may be in the left hand end of the cylinder 8 will be discharged back to the pump and at the same time the fluid forced by the pump through the port 42′ will pass out of the valve through the ports 45 and 39 to the pipe 7, and drive the piston in the cylinder 8 to the left hand end of said cylinder.

From the above description it will be seen that this valve will permit the flow of fluid from any suitable source of supply to one end of the hydraulic cylinder and at the same time allow the fluid in the other end of the hydraulic cylinder to escape therefrom, the reverse operation taking place at will. However, the flow of the fluid into the valve casing is always in the same direction, and the flow of the fluid therefrom is always in the same direction, and may be continuous if the by-pass 41 is placed in the proper position.

Having thus described my invention, what I desire to secure by Letters Patent of the United States is as follows, but modifications may be made in carrying out the invention shown in the drawings and in the above particularly described form thereof within the purview of the annexed claims.

1. A valve of the character described comprising a valve casing, a frustoconical valve rotatably mounted in said casing, said casing being formed with a receiving and an exhaust port spaced longitudinally of the valve, said valve member being formed with a by-pass channel adapted to connect the receiving and exhaust ports when the valve is in one position to direct fluid from the receiving port directly to the exhaust port, a pair of inlet and outlet ports disposed one at each end of the casing diametrically opposed to the receiving and exhaust ports, outlet ports formed in the casing at opposite ends thereof and at opposite sides of the inlet and outlet ports, a pair of outlet ports formed in the valve and disposed one at each end of the valve member and disposed at opposite sides of said inlet and outlet ports for registration with the inlet and outlet ports, discharge ports formed one at each end of the valve member and at opposed positions thereon for forming a communication between the outlet ports and the adjacent inlet and outlet ports whereby rotation of the valve may position said by-pass channel to by-pass fluid from the receiving to the exhaust ports or to direct fluid through said valve member from the receiving port through either of said outlet and inlet ports and through the opposite outlet and inlet ports through said outlet and discharge ports to said exhaust port.

2. A valve of the character described comprising a valve casing, a frustoconical valve rotatably mounted in said casing, said casing being formed with a receiving and an exhaust port spaced longitudinally of the valve, said valve member being formed with a by-pass channel adapted to connect the receiving and exhaust ports when the valve is in one position to direct fluid from the receiving port directly to the exhaust port, a pair of inlet and outlet ports disposed one at each end of the casing diametrically opposed to the receiving and discharge ports, outlet ports formed in the casing at opposite ends thereof and at opposite sides of the inlet and outlet ports, a pair of outlet ports formed in the valve and disposed one at each end of the valve member and disposed at opposite sides of said inlet and outlet ports for registration with the inlet and outlet ports, discharge ports formed one at each end of the valve member and at opposite positions thereon for forming a communication between the outlet ports and the adjacent inlet and outlet ports whereby rotation of the valve may position said by-pass channel to by-pass fluid from the receiving to the exhaust ports or to direct fluid through said valve member from the receiving port through either of said outlet and inlet ports and through the opposite outlet and inlet ports through said outlet and discharge ports to said exhaust ports, a stud on one end of said valve member, a ball bearing on said stud, means for adjusting said bearing, an operating shaft extending co-axially from the other end of said valve, a ball bearing mounted in the casing for supporting said shaft, and means for adjusting said last mentioned bearing.

In testimony whereof I have hereunto set my hand this 14th day of September, A. D. 1927.

WESLEY K. McMILLAN.